Dec. 29, 1936.   C. E. REED   2,065,739
ROLLER CUTTER AND SPINDLE ASSEMBLY FOR EARTH BORING DRILLS
Original Filed Feb. 23, 1935

Inventor:
Clarence E. Reed,

Patented Dec. 29, 1936

2,065,739

UNITED STATES PATENT OFFICE 2,065,739

ROLLER CUTTER AND SPINDLE ASSEMBLY FOR EARTH BORING DRILLS

Clarence E. Reed, Wichita, Kans., assignor to Chicago Pneumatic Tool Company, New York, N. Y., a corporation of New Jersey Application February 23, 1935, Serial No. 7,918
Renewed November 11, 1936

8 Claims. (Cl. 255—71)

The invention concerns a roller cutter spindle and anti-friction bearing assembly for earth boring drills in which rolling members are employed for rotatively locking the cutter on the spindle.

The invention is illustrated in the accompanying drawing, in which.

Figure 1:
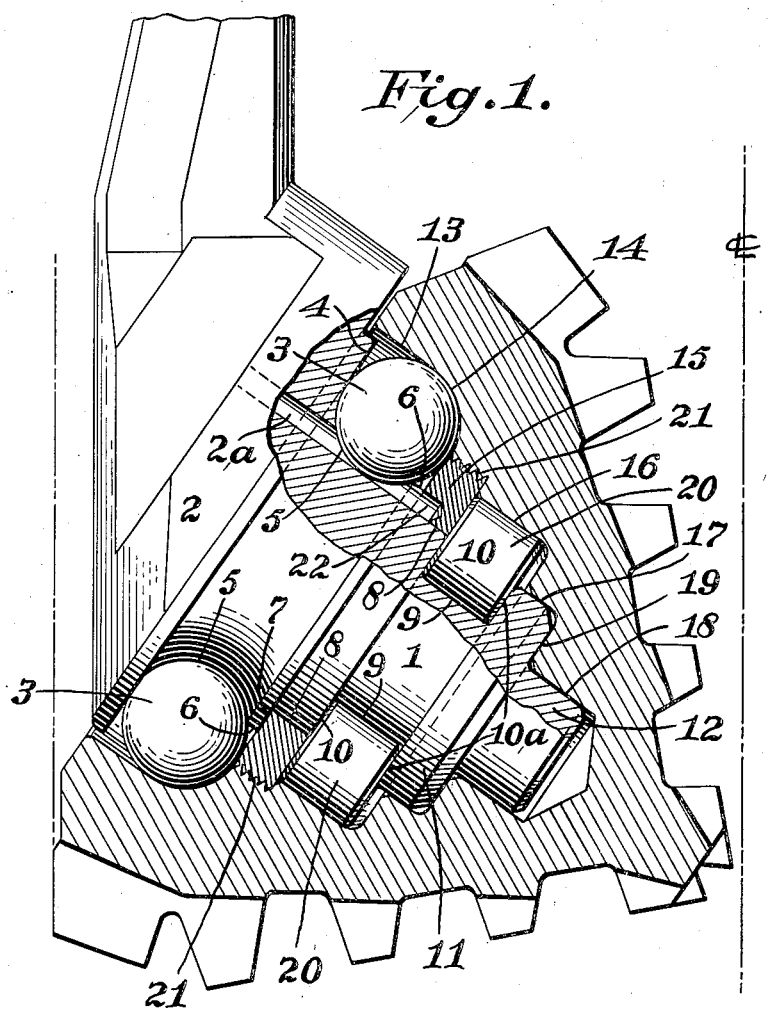
Figure 1 is a view of the cutter in place on the spindle with rolling bearings in place.

In the drawing, 1 is the spindle of one piece having a support 2 formed integrally therewith. A track for ball bearings 3 is formed at the junction of the spindle, and the face 4. This track, marked 5, is curved in cross section conforming to the curve of the ball. The transverse curve of the track follows the surface of the ball to the point 6, forming an annular groove in the surface of the spindle for the balls to run in. Spaced apart slightly from this groove there is a shoulder 7 lying in a plane at right angles to the axis of the spindle. This shoulder extends to the cylindrical surface of the spindle at 8. Adjoining this annular cylindrical surface, the spindle is formed with an annular recess or groove, the bottom 9 of which is cylindrical and extends between the defining walls 10, 10a which are parallel with each other. Next to this annular groove 9, 10 is the spindle portion 11 of full diameter, and next to this is the reduced diameter cylindrical centering extension 12, which also is integral with the spindle. The peripheral surface of the spindle portion 11 and the peripheral surface at 8 of the spindle are of equal diameter, and this is true also of the spindle in a transverse plane of the spindle through the bottom of the ball groove. The cutter is provided at its base with a large diameter open bore defined by the cylindrical wall 13, a transversely curved track 14, a screw threaded bore 15 of a diameter less than that of the wall 13, and communicating with the large diameter bore. Adjacent the screw threaded bore is a smooth cylindrical bore 16 of smaller diameter and of a width equal to and opposite that of the bottom wall 9 of the annular groove 9, 10, 10a of the spindle. This bore, defined by the wall 16, opens into that defined by the screw threaded wall 15. Next to the bore 16 is a still smaller bore in the cutter which is designated 17, the width of said bore being equal to the width of the spindle portion 11 and having a friction bearing on the periphery of the said part 11. Next to this bore 17 is the smallest diameter bore 18, the cylindrical wall of which smallest bore has a friction bearing on the smallest diameter portion 12 of the spindle. This small diameter extension of the spindle is the terminus thereof. This is enclosed by the apex portion of the frusto-conical cutter. An end thrust bearing exists between the cutter and the end face of the spindle proper at 19.

In the raceway made up in part by the annular groove 9, 10, 10a of the spindle, and in part by the walls defining the bore 16, is located a row of anti-friction rollers 20 of cylindrical form.

In the screw threaded bore 15 and engaging the threads thereof is located the ring 21 having a screw threaded periphery. This ring on its inner peripheral face bears upon the cylindrical face 8 of the spindle. At one side face the ring contacts the shoulder 7, and at the other side face this ring bears upon an end face of the cylindrical roller 20. The balls take radial loads as well as end thrust loads imposed by the rotary cutter in the direction of the axis of the cutter, said end thrusts being carried into the spindle support. The cylindrical rollers 20, together with the screw threaded ring, lock the roller cutter rotatively upon the spindle, it being noted that the end face of the said rollers facing the apex end of the cutter bears upon the side wall 10a of the groove 9, 10, 10a which is nearest the spindle free end and by the cooperation of the ring carried by the cutter and the rolling bearings in the groove of the spindle, the cutter is locked rotatively in place.

The assembly involves a spindle which is of one piece throughout, as well as adapted for drills of the smallest diameters.

Figure 2:
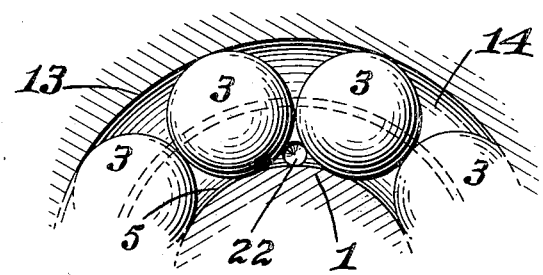
Fig. 2 is a diagrammatic view of a detail.

In order to place the screw threaded ring into connection with the roller cutter, said ring is provided with an aperture or other suitable formation indicated at 22 to receive the end of a holding tool which is inserted into place through an aperture 2a extending through the support of the cutter. When this holding tool is in place the ring will be held against turning, while the roller cutter is placed in position and turned so as to be screwed onto the screw threaded ring. The aperture 2a for the introduction or removal of the tool is at a point distant from the axial center of the spindle substantially equal to the radial distance of the bottom of the ball groove from said axis, so that the tool, when inserted into place, will extend through the space between adjacent balls as indicated diagrammatically in Figure 2. In assembling the parts, the locking ring is first put in position on the spindle against the shoulder 7, then the rollers 20 are placed in the annular groove or recess of the spindle, and thereafter the ball bearings 3 are placed in position. The bore of the cutter is of such formation that the cutter now can be threaded over the free end of the spindle, over the rollers 20, and when the screw threaded bore of the cutter reaches the screw threaded ring, the cutter is turned so as to screw said cutter into place on the screw threaded ring, said ring in the meantime being held against rotation by the holding tool inserted through the aperture 2a. The turning movement of the cutter is continued until said cutter is firmly seated into connection with the screw threaded ring, and thereupon the various portions of the bore of the cutter will have found their positions relative to the cooperating parts of the spindle and the rolling bearings.

It will be seen from the above disclosure that I provide an assembly in which the cutter is rotatably locked on the spindle by the use of a ring attached to the cutter and extending into connection with members mounted on the spindle, and at the same time the arrangement is such that anti-friction bearings are so located in respect to the spindle and its support as to take both radial and end thrusts. In other words, the locking ring is located at a point in advance of the ball bearings 3; that is, at a point intermediate of the length of the bore of the cutter, leaving the enlarged portion of the bore at the base end of the cutter free to receive the ball bearings so as to contact both with the spindle and its support in receiving radial and end thrusts.

I do not limit myself to the specific details of construction and arrangement herein shown, the scope of the invention being defined by the appended claims.

I claim:

1. A roller cutter and spindle assembly for earth boring drills comprising a spindle having a free end, a support connected with its other end, a frusto-conical cutter mounted on the spindle, a plurality of spaced apart rows of rolling bearings between the spindle and cutter, and a ring connected to and carried by the cutter within its bore and at a point intermediate the length thereof and intermediate the said spaced apart rows of rolling bearings, said ring engaging one of the rows of bearings mounted in an annular groove of the spindle to rotatively lock the roller cutter on the spindle, substantially as described.

2. A roller cutter and spindle assembly for earth boring drills comprising a spindle having a free end, a support connected with the base of the spindle, a frusto-conical cutter mounted on the spindle having a plurality of spaced apart rows of rolling bearings between the cutter and the spindle, and a screw threaded ring screwed into the bore of the cutter at a point intermediate the length thereof and intermediate the said spaced apart rows of rolling bearings, said ring engaging one of the rows of bearings to rotatively lock the roller cutter on the spindle, substantially as described.

3. A roller cutter, spindle, and bearing assembly for earth boring drills comprising a spindle, a support therefor, a toothed frusto-conical cutter mounted on and enclosing the free end of the spindle, ball bearings between the base portion of the cutter, the spindle, and the spindle support taking radial loads and end thrust, a ring screw threaded into the bore of the cutter at a point between the ball bearings and the free end of the spindle, and rolling members mounted in a recess of the spindle between the ring and the free end of the spindle with which said ring engages for locking the roller cutter rotatively on the spindle, substantially as described.

4. A roller cutter and spindle assembly for earth boring drills according to claim 1 in which the ring carried by the cutter has friction bearing contact at its inner periphery with the spindle.

5. A roller cutter and spindle assembly according to claim 1 in which the ring and the wall of the cutter bore have friction contact with the periphery of the spindle, substantially as described.

6. A spindle for a roller cutter assembly of earth boring drills having a support at one end connected thereto, a track adjacent said support for ball bearings, a seat next to said track to receive a ring portion fixed to and rotating with a cutter, an annular groove in said spindle adjacent said seat, and a reduced diameter free end, said spindle being formed in one piece throughout, substantially as described.

7. A cutter of frusto-conical form for earth boring drills having a bore at its base next to which is a smaller diameter bore, the wall of which is screw threaded, and next to which is a smooth wall smaller diameter cylindrical bore communicating with the screw threaded bore, and a cylindrical bore of still smaller diameter located towards the apex portion of the cutter, substantially as described.

8. A roller cutter and spindle assembly for earth boring drills comprising a spindle having a free end, a support connected with its other end, a frusto-conical cutter mounted on the spindle, a plurality of spaced apart rows of rolling bearings between the spindle and cutter one of which rows is in the base of the cutter, a ring connected to and carried by the cutter within its bore and at a point intermediate the length thereof and intermediate the said spaced apart rows of rolling bearings, said ring engaging one of the rows of bearings mounted in an annular groove of the spindle to rotatively lock the roller cutter on the spindle, said ring being screw threaded into connection with the cutter, said ring having a portion to be engaged by a holding tool, while the cutter is being turned into connection therewith, the spindle organization having an aperture in line with the spaces between the rolling bearings in the face of the cutter through which said holding tool may be introduced to temporarily engage the ring, substantially as described.

CLARENCE E. REED.